United States Patent
Kohn et al.

(10) Patent No.: US 12,377,379 B2
(45) Date of Patent: Aug. 5, 2025

(54) FILTER ELEMENT, HOUSING FOR A FILTER SYSTEM, AND FILTER SYSTEM COMPRISING A FILTER ELEMENT AND A HOUSING

(71) Applicant: MANN+HUMMEL GmbH, Ludwigsburg (DE)

(72) Inventors: Kevin Kohn, Großbottwar (DE); Pascal Neef, Trossingen (DE)

(73) Assignee: MANN+HUMMEL GmbH, Ludwigsburg (DE)

(*) Notice: Subject to any disclaimer, the term of this patent is extended or adjusted under 35 U.S.C. 154(b) by 415 days.

(21) Appl. No.: 18/085,247

(22) Filed: Dec. 20, 2022

(65) Prior Publication Data

US 2023/0118296 A1    Apr. 20, 2023

Related U.S. Application Data

(63) Continuation of application No. PCT/EP2021/063907, filed on May 25, 2021.

(30) Foreign Application Priority Data

Jun. 22, 2020 (DE) .......................... 102020116398.3

(51) Int. Cl.
   *B01D 46/52* (2006.01)
   *B01D 46/00* (2022.01)

(52) U.S. Cl.
   CPC ....... *B01D 46/521* (2013.01); *B01D 46/0005* (2013.01); *B01D 2265/026* (2013.01); *B01D 2265/06* (2013.01)

(58) Field of Classification Search
   CPC .............. B01D 46/521; B01D 46/0005; B01D 2265/026; B01D 2265/06; B01D 2265/021; B01D 2275/206; B01D 46/2414; B01D 46/2411; F02M 35/0201; F02M 35/02416
   See application file for complete search history.

(56) References Cited

U.S. PATENT DOCUMENTS

| 9,314,725 | B2 | 4/2016 | Kaiser |
| 11,117,082 | B2 | 9/2021 | Neef et al. |
| 11,504,664 | B2 | 11/2022 | Bessone et al. |

(Continued)

FOREIGN PATENT DOCUMENTS

| CN | 202789228 U | 3/2013 |
| DE | 202008001819 U1 | 6/2009 |

(Continued)

*Primary Examiner* — Pranav N Patel

(57) ABSTRACT

A filter element for filtering a fluid has a support pipe and a filter bellows arranged about a longitudinal axis on the support pipe. The filter bellows has folds with radially outer fold edges. The filter bellows has a first axial end and a second oppositely positioned axial end. The filter bellows has a notch at least at one of the first and second axial ends. An axial length of the notch in longitudinal direction is shorter than a longitudinal extension of the filter bellows. The support pipe has a support structure at the axial end with the notch and has at least two wings. The support structure is oriented radially away from the support pipe and is integrated into the end disk at both sides of the notch. A filter system with such a filter element arranged in a housing is provided.

24 Claims, 8 Drawing Sheets

(56) References Cited

U.S. PATENT DOCUMENTS

| | | |
|---|---|---|
| 2002/0073665 A1 | 6/2002 | Gieseke et al. |
| 2004/0134171 A1 | 7/2004 | Scott et al. |
| 2005/0061292 A1 | 3/2005 | Prellwitz et al. |
| 2009/0038276 A1 | 2/2009 | Gunderson et al. |
| 2009/0049814 A1 | 2/2009 | Baseotto et al. |
| 2010/0146917 A1 | 6/2010 | Coulonvaux et al. |
| 2010/0146920 A1 | 6/2010 | Iddings et al. |
| 2011/0000174 A1 | 1/2011 | Kapelarie et al. |
| 2011/0203240 A1 | 8/2011 | Langner |
| 2013/0042587 A1 | 2/2013 | Traub |
| 2013/0086877 A1 | 4/2013 | Kori et al. |
| 2013/0232934 A1* | 9/2013 | Baseotto ............ B01D 46/2411 55/502 |
| 2014/0102060 A1 | 4/2014 | Kato et al. |
| 2014/0144111 A1 | 5/2014 | Campbell et al. |
| 2014/0373495 A1 | 12/2014 | Madeira et al. |
| 2016/0114275 A1 | 4/2016 | Schwartz et al. |
| 2018/0036667 A1 | 2/2018 | Neef et al. |
| 2018/0050296 A1 | 2/2018 | Fritzsching et al. |
| 2018/0369732 A1 | 12/2018 | Karlsson et al. |
| 2019/0060816 A1 | 2/2019 | Wittmers et al. |
| 2019/0134546 A1 | 5/2019 | Neef et al. |
| 2019/0209959 A1 | 7/2019 | Luchesi De Almeida et al. |
| 2019/0209960 A1 | 7/2019 | Luchesi De Almeida et al. |
| 2019/0308125 A1* | 10/2019 | Neef .................. F02M 35/0201 |
| 2020/0376425 A1 | 12/2020 | Neef |
| 2021/0069630 A1 | 3/2021 | Neef et al. |
| 2021/0069631 A1 | 3/2021 | Neef et al. |
| 2021/0086119 A1 | 3/2021 | Neef et al. |
| 2021/0121807 A1 | 4/2021 | Neef et al. |
| 2021/0138380 A1 | 5/2021 | Neef et al. |

FOREIGN PATENT DOCUMENTS

| | | | |
|---|---|---|---|
| DE | 102013014498 A1 | 3/2015 | |
| DE | 102019109202 A1 | 2/2020 | |
| EP | 2213869 A2 | 8/2010 | |
| EP | 2535550 A2 | 12/2012 | |
| WO | 11048197 A1 | 4/2011 | |
| WO | 16128275 A1 | 8/2016 | |
| WO | 18072976 A1 | 4/2018 | |
| WO | WO-2018073198 A1 * | 4/2018 | ............. B01D 27/08 |
| WO | 2019219654 A1 | 11/2019 | |

* cited by examiner

FILTER ELEMENT, HOUSING FOR A FILTER SYSTEM, AND FILTER SYSTEM COMPRISING A FILTER ELEMENT AND A HOUSING

CROSS-REFERENCE TO RELATED APPLICATIONS

This application is a continuation application of international application No. PCT/EP2021/063907 having an international filing date of 25 May 2021 and designating the United States, the international application claiming a priority date of 22 Jun. 2020 based on prior filed German patent application No. 10 2020 116 398.3, the entire contents of the aforesaid international application and the aforesaid German patent application being incorporated herein by reference.

BACKGROUND OF THE INVENTION

The invention concerns a filter element, a housing for a filter system, as well as a filter system, in particular an air filter system, with a filter element and a housing.

The intake air of internal combustion engines is usually purified by means of an air filter from contaminations prior to entering a combustion chamber of the internal combustion engine. Air filter elements used for this purpose can comprise a filter medium folded in a star shape and surrounding annularly a longitudinal axis. For internal combustion engines of commercial vehicles, for example, heavy trucks, such a filter element can have a length of more than 300 mm, in particular of more than 500 mm. The filter elements must be fastened safely in their filter housing. Since filter media clog with particles filtered out of the air in operation, a regular exchange of the filter elements is required.

DE 10 2013 014 498 A1 discloses a filter element which comprises a filter body in concentric shape relative to a longitudinal axis, a first end disk arranged at an end face, and a second end disk arranged at the oppositely positioned end face. At least one of the end disks comprises a centering element arranged about the longitudinal axis which is stiffened by a stiffening element. In this way, the filter element can be centered and/or supported at least radially when installed in a housing. Moreover, the centering element comprises an annular body and support elements arranged thereat and extending in the direction of the longitudinal axis. The support elements are provided for contacting an inner cover contour of the housing for axial support of the filter element. The filter element comprises a centering element stiffened by stiffening elements, whereby the bending stiffness of the centering element is increased in comparison to conventional projecting clamping protrusions, such as knobs or similar elements, at a closed filter element end disk in a pure polyurethane embodiment in which the knobs are axially compressed or bent radially inwardly. DE 10 2019 109 202 A1 discloses a filter element with a filter bellows with a notched end disk. A notch structure projects in axial direction from the end disk into the filter bellows. The notch structure is formed in axial direction in a wedge shape and comprises two curved wings which meet each other at the center of the notch structure and extend symmetrically outwardly away from their contact surface. The notch structure of the end disk engages in this context in axial direction between two folds of the filter bellows and spreads them apart in a wedge shape in axial direction.

SUMMARY OF THE INVENTION

It is an object of the invention to provide a filter element that enables a simple exchange even for a tight installation space.

A further object of the invention is providing a filter system that enables a simple exchange of the filter element.

A further object of the invention is providing a housing for such a filter system that enables a simple exchange and a positionally correct installation of the filter element.

The aforementioned object is solved according to an aspect of the invention by a filter element for filtering a fluid, in particular a gaseous fluid, with a longitudinal axis as well as a filter bellows arranged about the longitudinal axis on a support pipe and enclosing an interior, with an end face first axial end and an end face second axial end oppositely positioned thereto, wherein at least one of the ends comprises an end disk, wherein the filter bellows comprises folds whose radially outer fold edges are positioned on its outer wall surface, wherein the filter bellows comprises at least at one of its end face ends a notch whose axial length in direction of the longitudinal axis is shorter than a length extension of the filter bellows in direction of the longitudinal axis, and wherein the support pipe at the at least one end with the notch comprises a support structure with at least two wings which is oriented radially away from the support pipe and which is integrated into the end disk at both sides of the notch.

A further object is solved according to an aspect of the invention by a filter system with a housing with a fluid inlet and a fluid outlet and an exchangeable filter element which is arranged in the housing, wherein the filter element is provided for filtering a fluid, in particular a gaseous fluid, and comprises a longitudinal axis, with a filter bellows arranged about the longitudinal axis and enclosing an interior, with an end face first axial end and an end face second axial end oppositely positioned thereto, wherein at least one of the ends comprises an end disk, wherein the filter bellows comprises folds whose radially outer fold edges are positioned on its outer wall surface, wherein the filter bellows comprises at least at one of its end face ends a notch whose axial length in direction of the longitudinal axis is shorter than a length extension of the filter bellows in direction of the longitudinal axis, and wherein the support pipe at the at least one end with the notch comprises a support structure with at least two wings which is oriented radially away from the support pipe and which is integrated into the respective end disk at both sides of the notch.

A further object according to an aspect of the invention is solved by a housing for a filter system, wherein at least one counter element, in particular a corresponding notch, is provided at a housing part and interacts with a notch at the filter element.

Beneficial configurations and advantages of the invention result from the additional claims, the description, and the drawing.

A filter element for filtering a fluid, in particular a gaseous fluid, is proposed, with a longitudinal axis as well as a filter bellows arranged about the longitudinal axis on a support pipe and enclosing an interior, with an end face first axial end and an end face second axial end oppositely positioned thereto, wherein at least one of the ends comprises an end disk. The filter bellows comprises folds whose radially outer fold edges are positioned in its outer wall surface. The filter bellows comprises at least at one of its end face ends a notch whose axial length in the direction of the longitudinal axis is shorter than a length extension of the filter bellows in direction of the longitudinal axis. The support pipe comprises at the at least one end with the notch a support structure with at least two wings which is radially oriented away from the support pipe and which is integrated into the end disk at both sides of the notch.

Advantageously, the filter element can be mounted positionally correct due to the at least one notch. The at least one notch provides for an unambiguous positioning of the filter element. The filter surface remains almost unchanged despite the at least one notch. Preferably, the filter element is provided for filtering a gaseous fluid, preferably for filtering air.

The folds of the filter bellows are held in their position by the at least one end disk. The filter bellows is closed and sealed at this end by the end disk. The end disk can be of a closed configuration or can be designed to be open toward an interior of the filter element. Usually, the filter elements comprise end disks at both ends, of which one is designed closed and one open. In this way, the fluid to be filtered can flow from the exterior via the wall surface of the filter bellows into the interior. The filtered fluid can then flow out again from the interior through the open end disk and leave the filter system. The end disks can be formed in customary manner, for example, of foamed polyurethane (PUR).

The end disk comprises a notch structure which corresponds to the notch formed with the folds of the filter bellows. By means of this notch, the filter element can be positioned in correct position about the longitudinal axis in the housing of a filter system at a corresponding counter element with a corresponding notch. Since the end disk of PUR is relatively flexible, in case of an incorrectly positioned insertion into the housing, it can however happen that the end disk is compressed or bent by the counter element and the folds of the filter bellows thus become deformed or damaged in the region of the notch.

In order to minimize this risk, it is proposed according to the invention that a support structure, which is arranged at a support pipe of the filter element, reinforces mechanically the end disk and in particular the notch structure of the end disk. In this way, the risk can be reduced that the end disk due to positionally incorrect installation in the housing of the filter system becomes bent, whereby the folds are protected upon installation of the filter element. The installation force can therefore be introduced into the support pipe. The two wings of the support structure can advantageously be arranged such that they effectively reinforce the notch structure of the end disk.

According to a beneficial embodiment of the filter element, the support pipe at the at least one end with the notch can comprise a radially outwardly oriented collar at which the support structure is arranged. Due to the collar, the end disk, which is usually embodied of a relatively soft flexible material such as PUR, can be reinforced in a suitable manner. In this way, the risk can be reduced that the filter bellows upon installation and/or in operation becomes damaged, for example, by exerting too high a pressure. In particular, the two wings of the support structure with the radially outwardly projecting collar can be arranged in a plane perpendicular to the longitudinal axis. In this way, a flat annular structure of the collar and the wings of the support structure is formed.

According to a beneficial embodiment of the filter element, the two wings of the support structure can be arranged symmetrically in relation to a symmetry plane of the notch extending in the longitudinal axis. In this manner, the two wings of the support structure can be arranged advantageously such that they reinforce the notch structure of the end disk effectively because they can absorb possibly occurring forces at both sides of the notch structure during mounting.

According to a beneficial embodiment of the filter system, the two wings of the support structure can be of an areal configuration and/or can comprise a radially outwardly tapering, in particular triangular or trapezoidal, shape. In this way, the region of the end disk around the notch structure can be effectively reinforced while the remaining region of the end disk remains flexible in order to beneficially separate the raw fluid region and clean fluid region from each other in the interior of the housing of the filter system.

According to a beneficial embodiment of the filter element, the two wings of the support structure can be arranged with radially outwardly oriented collar in a plane perpendicular to the longitudinal axis. In this way, the notch structure can form with the collar a flat structure which is reinforced in the region of the notch structure. The notch in the filter bellows can be stabilized even when the notch structure does not axially engage the filter bellows. The risk that the end disk becomes bent in case of a positionally incorrect installation in the housing can be reduced so that the folds are protected when installing the filter element.

According to a beneficial embodiment of the filter element, the two wings can be arranged in the end disk so as to adjoin the notch. In particular, the two wings can be arranged in the end disk, in particular in the material of the end disk, for example, PUR. The wings can preferably adjoin the notch as close as possible at both sides. This enables a beneficial absorption of forces by the wings even in a material such as PUR, which is usually relatively soft and flexible and in this manner is beneficially reinforced by the wings adjoining the notch. In this way, the risk can be reduced that the filter bellows upon installation and/or in operation becomes damaged, for example, by exerting too high a pressure. Advantageously, the wings in the collar of the end disk adjoin the notch in the filter bellows as closely as possible at both sides.

According to a beneficial embodiment of the filter element, the wings can be designed to support and absorb in circumferential direction forces which widen the notch. In this way, the risk can be reduced that the filter bellows during installation and/or in operation becomes damaged, for example, by exerting too high a pressure.

According to a beneficial embodiment of the filter element, the support structure can comprise a rib structure with through holes. The rib structure can ensure a beneficial stiffness of the support structure while the through holes provide for a good anchoring of the support structure in the end disk during the manufacturing process of a foamed PUR end disk.

According to a beneficial embodiment of the filter element, the support structure and/or a radially outwardly oriented collar at the end with the notch at which the support structure is arranged can comprise positioning ribs which, in longitudinal direction of the support pipe, are configured to project past a surface, which is defined by the support structure and/or the collar, toward the other end of the support pipe.

By means of the positioning ribs, a predetermined axial distance in longitudinal direction between the collar of the support pipe or the support structure, which are both integrated in the end disk, and an end face of the filter bellows can be maintained during manufacture of the filter element. In this way, the filter bellows can be held in a fixed axial position relative to the support pipe during the foaming process when manufacturing the end disk. In this manner, it can be prevented that air bubbles form in the PUR end disk in the region between collar and/or support structure or stay adhered in this region, which could lead to possible leakage between raw region and clean region of the filter system in operation of the filter element.

According to a beneficial embodiment of the filter element, the positioning ribs can be aligned parallel to each other. In this manner, the manufacturing tool of the support pipe can be designed beneficially with a suitable demolding direction.

According to a beneficial embodiment of the filter system, the positioning ribs which are arranged on the collar can be arranged distributed about a collar surface of the collar. In this way, a uniform support of the end face of the filter bellows on the collar can be ensured. Also, the risk is thereby reduced that the filter bellows tilts upon installation.

According to a beneficial embodiment of the filter element, a height of the positioning ribs above the surface can amount to at least half the thickness of the support structure in longitudinal direction. Typical values for an axial rib thickness of the rib structure of the collar and/or of the support structure can lie in the range between 2.5 mm and 3.0 mm. An axial projection past the surface formed by the collar and/or support structure can therefore amount to beneficially at least 1.25 mm. Values of approximately 2.5 mm have been found to be very beneficial.

According to a beneficial embodiment of the filter element, the folds at least in sections can be held by fixation elements, in particular thread coils, at a constant, in particular equidistant, spacing relative to each other. The filter element can be produced substantially by customary manufacturing methods.

According to a further aspect of the invention, a filter system with a housing with a fluid inlet and a fluid outlet and an exchangeable filter element arranged in the housing is proposed, wherein the filter element is provided for filtering a fluid, in particular a gaseous fluid, and comprises a longitudinal axis, with a filter bellows arranged about the longitudinal axis and enclosing an interior, with an end face first axial end and an end face second axial end oppositely positioned thereto, wherein at least one of the ends comprises an end disk. The filter bellows comprises folds whose radially outer fold edges are positioned in its outer wall surface. The filter bellows comprises at least at one of its end face ends a notch whose axial length in direction of the longitudinal axis is shorter than a length extension of the filter bellows in direction of the longitudinal axis. The support pipe comprises at the at least one end with the notch a support structure with at least two wings, which is radially oriented away from the support pipe and which is integrated in the respective end disk at both sides of the notch.

Advantageously, the filter element can be held by friction by the corresponding notch, in particular when inserting the filter element into the housing. When inserting the filter element into the housing, the friction, for example, in case of slanted or horizontal position of the filter element, can counteract tilting of the filter element. The friction can be canceled in operation of the filter element with closed housing.

The cover can fix the filter element in the filter housing. In particular, the filter element in axial direction can be clamped between a bottom of the filter housing and the cover. Beneficially, the force flow of an axial holding force for the filter element extends through a center pipe of the filter element, as described above. The first end disk and a second end disk of the filter element can establish an elastic deformability in longitudinal direction of the filter element in order to provide a defined holding force in axial direction and permit a complete closure of the cover. In radial direction, the filter element can be supported with form fit at the filter pot and/or at the cover.

Preferably, the filter system is provided for filtering a gaseous fluid, preferably for filtering air. Preferably, the filter system is provided for installation in a vehicle, in particular in a commercial vehicle, preferably in a heavy commercial vehicle.

According to a beneficial embodiment of the filter system, inlet and outlet can be arranged at the same housing part. This permits a very compact configuration of the filter system.

According to a beneficial embodiment of the filter system, the support pipe at the at least one end with the notch can comprise a radially outwardly oriented collar at which the support structure is arranged.

According to a beneficial embodiment of the filter system, the support structure and/or a radially outwardly oriented collar arranged at the end with the notch at which the support structure is arranged can comprise positioning ribs which in longitudinal direction of the support pipe are configured so as to project past a surface, which is defined by the support structure and/or the collar, toward the other end of the support pipe.

By means of the positioning ribs, a predetermined axial distance in longitudinal direction between the collar of the support pipe or the support structure, which are both integrated in the end disk, and an end face of the filter bellows can be maintained during manufacture of the filter element. In this way, the filter bellows can be held in a fixed axial position relative to the support pipe during the foaming process of the end disk. In this manner, it can be prevented that air bubbles in the region between collar and/or support structure are formed in the PUR end disk or stay adhered in this region, which in operation of the filter system could lead to possible leakage between raw region and clean region of the filter system.

According to a further aspect of the invention, a housing for a filter system is proposed wherein at least one counter element, in particular a corresponding notch, is provided in a housing part that is interacting with a notch at the filter element.

Beneficially, a filter element in slanted or horizontal position can be positioned in correct position in the housing and protected against tilting. This is in particular advantageous for large filter elements as they are employed in commercial vehicles and which have a high weight in the loaded state.

Beneficially, the housing in compact embodiment can comprise inlet and outlet at the same housing part. Moreover, a clean fluid channel can be provided arranged in the cover of the housing so that the cover can be arranged at the clean side of the filter system. This can be beneficial in case of tight spatial conditions in commercial vehicles.

BRIEF DESCRIPTION OF THE DRAWINGS

Further advantages result from the following drawing description. In the drawings, embodiments of the invention are illustrated. The drawings, description. and the claims contain numerous features in combination. A person of skill in the art will expediently consider the features also individually and combine them to meaningful additional combinations.

DESCRIPTION OF PREFERRED EMBODIMENTS

Figure 1:
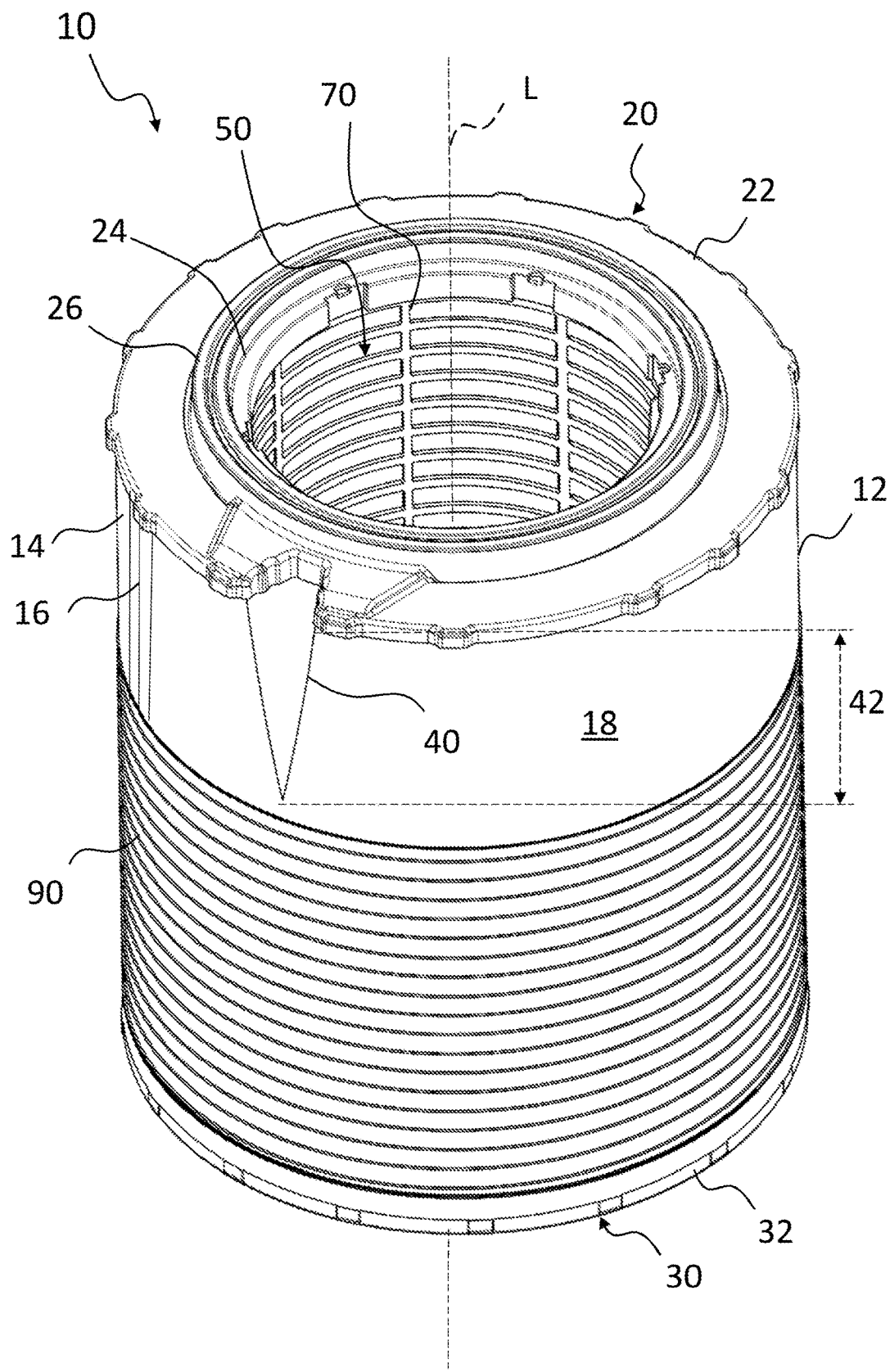
FIG. 1 shows a filter element in isometric illustration according to a first embodiment of the invention with expanded folds of a notch at an end of the filter element.

In the Figures, same or same-type components are identified with same reference characters. The Figures show only examples and are not to be understood as limiting.

Figure 6:
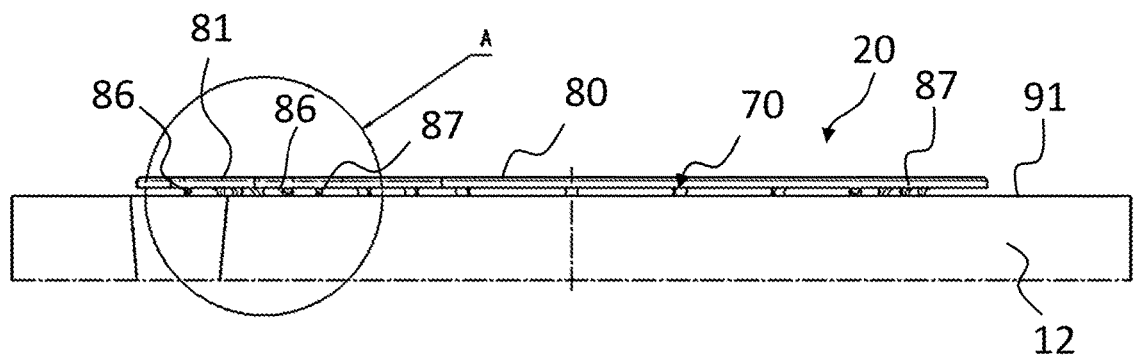
FIG. 6 shows a side view of a part of the filter bellows with support pipe with indicated detail A.
Figure 7:
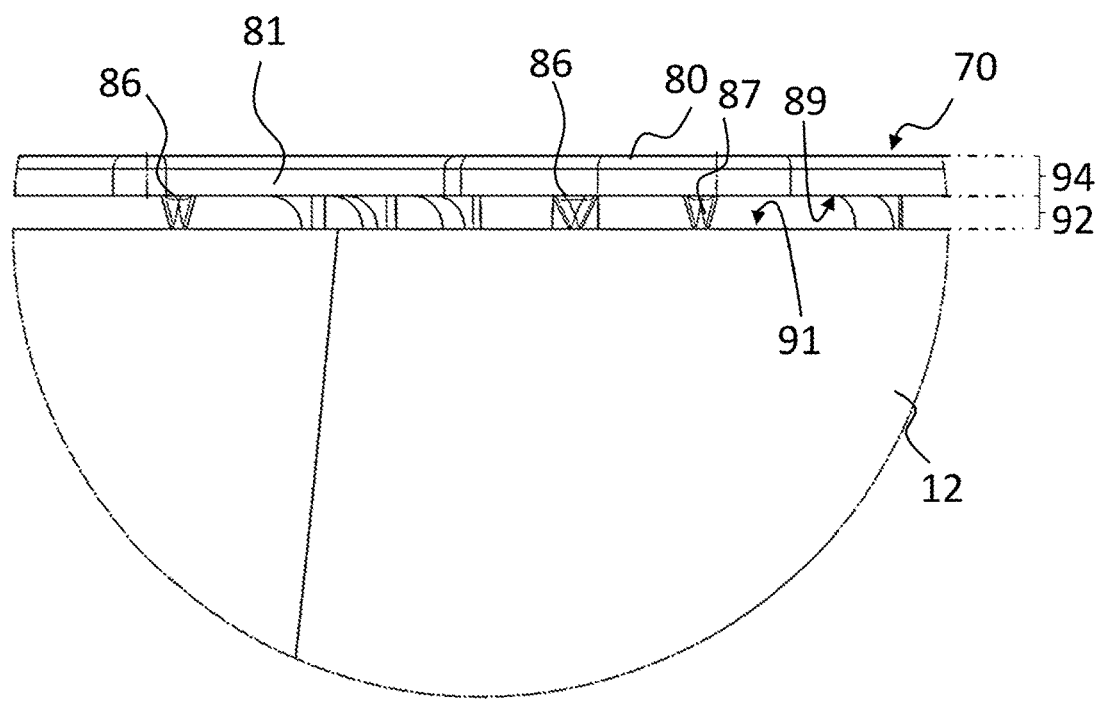
FIG. 7 shows the detail A of the filter bellows with support pipe according to FIG. 6.
Figure 8:
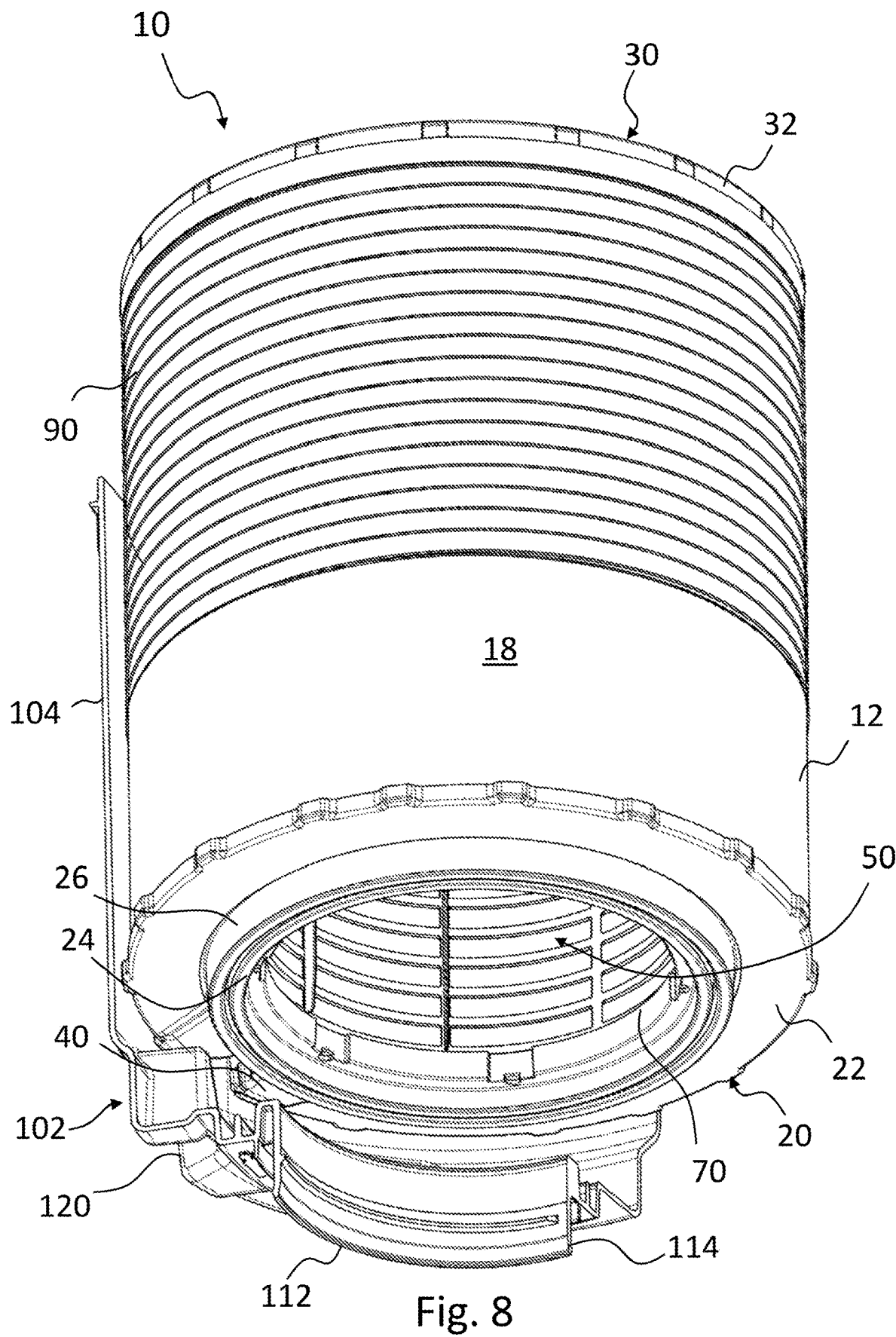
FIG. 8 shows the filter element according to FIG. 1 with a part of the cut-open housing of the filter system in isometric illustration.
Figure 9:
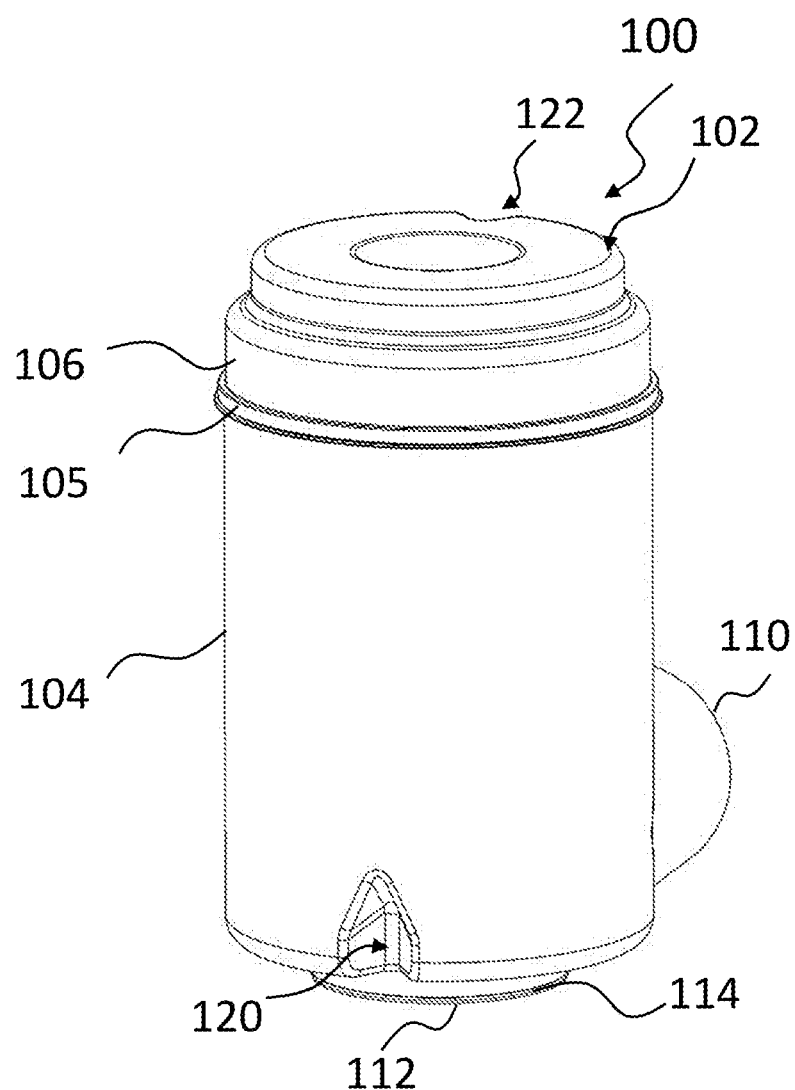
FIG. 9 shows an isometric view of a filter system according to an embodiment of the invention.

FIGS. 1 to 9 illustrate a first embodiment of the invention with a filter element 10 (FIGS. 1-3) and a filter housing 102 as well as filter system 100 (FIGS. 8 and 9).

In FIG. 1, the filter element 10 is illustrated in isometric illustration according to a first embodiment of the invention with expanded folds 14 of a notch 40 at an end 20 of the filter element 10.

As can be seen in FIG. 1, the filter element 10 comprises a filter bellows 12 which extends along a longitudinal axis L and surrounds an interior 50.

The filter bellows 12 is formed, for example, of a folded filter material that is formed to a filter bellows 12 closed in itself and is arranged on a support pipe 70. The support pipe 70 can comprise at least one inwardly oriented rib 78, see FIG. 4, which serves for reinforcing the body 76 of the support pipe 70.

Figure 2:
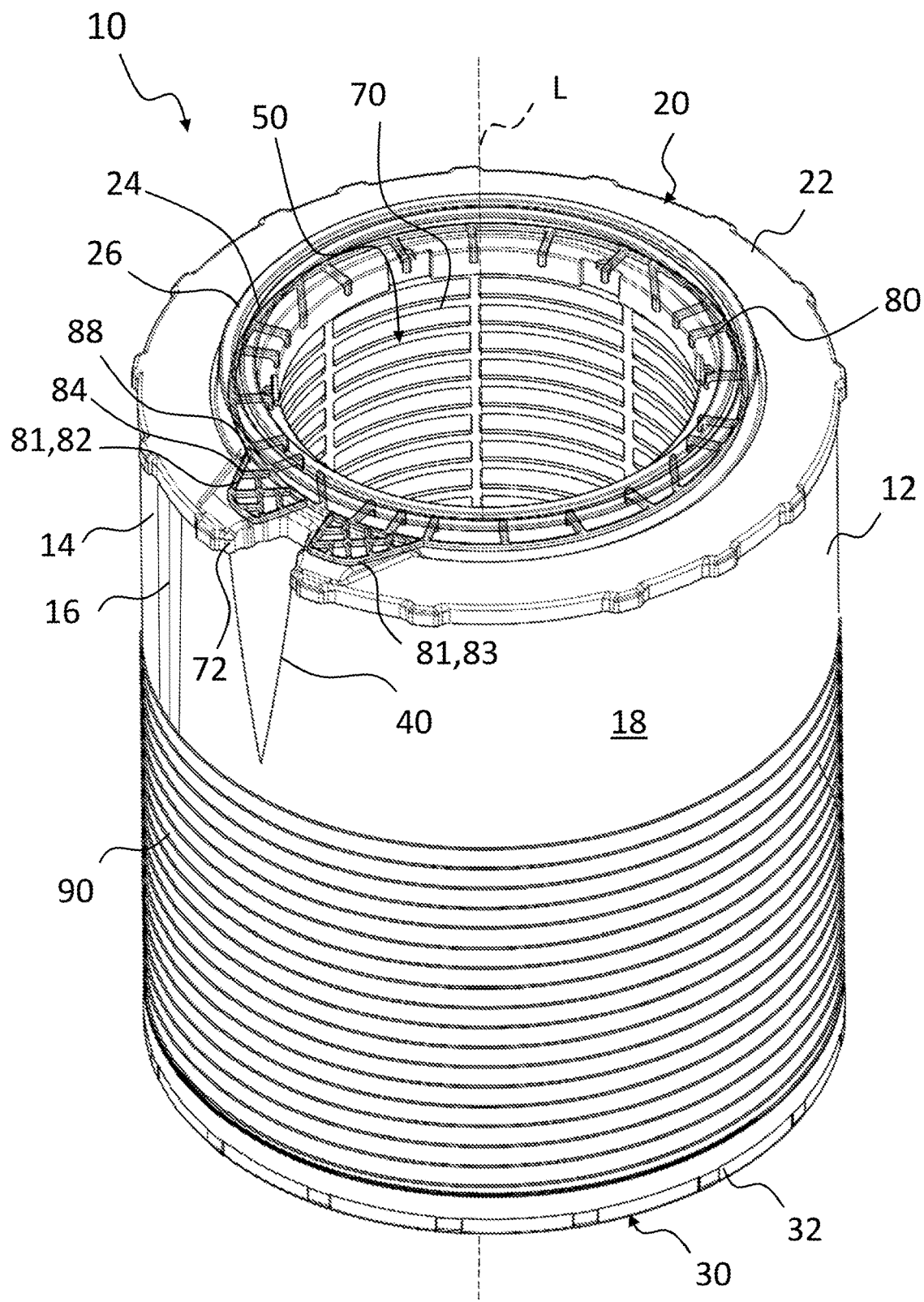
FIG. 2 shows the filter element according to FIG. 1 with transparently illustrated end disk which shows a support structure arranged at the support pipe.

The folds 14 are only indicated in an exemplary fashion in FIGS. 1 and 2 and extend across the entire length of the filter bellows 12. The longitudinal edges 16 of the folds 14 are positioned in an outer wall surface 18 of the filter bellows 12. The filter bellows 12 is configured as a round element in this example.

At an end face first axial end 20 and an end face second axial end 30 oppositely positioned thereto of the filter element 10, end disks 22, 32 are arranged which seal the filter bellows 12 at its end edges. The end disks 22, 32 can be formed in a customary manner, for example, of foamed polyurethane.

At the first axial end 20, an end disk 22 is arranged which is open toward the interior 50. At the oppositely positioned second axial end 30, a closed end disk 32 is arranged.

The open end disk 22 comprises an outwardly oriented ring 26 which surrounds the opening 24 in the end disk 22. The ring 26 can serve as a seal. Preferably, end disk 22 and ring 26 are designed as one piece. In particular, the end disk with the ring 26 can be formed of polyurethane.

The flow direction of the fluid to be filtered is oriented through the filter bellows 12. When it's clean side is provided in the interior, the fluid flows from the exterior of the filter bellows 12 into the interior 50 and from there through the opening 24 out of the filter element 10. Optionally, the flow direction can also be provided in reverse.

The filter bellows 12 comprises at its first axial end 20 a notch 40 whose axial length 42 in the direction of the longitudinal axis L is shorter than the length extension of the filter bellows 12 in the direction of the longitudinal axis L. The notch 40 is locally limited and does not extend across the entire length of the filter bellows 12. Preferably, the notch 40 has the greatest fold edge distance at the respective end disk 22 and tapers with increasing distance away from the end disk 22.

Figure 3:
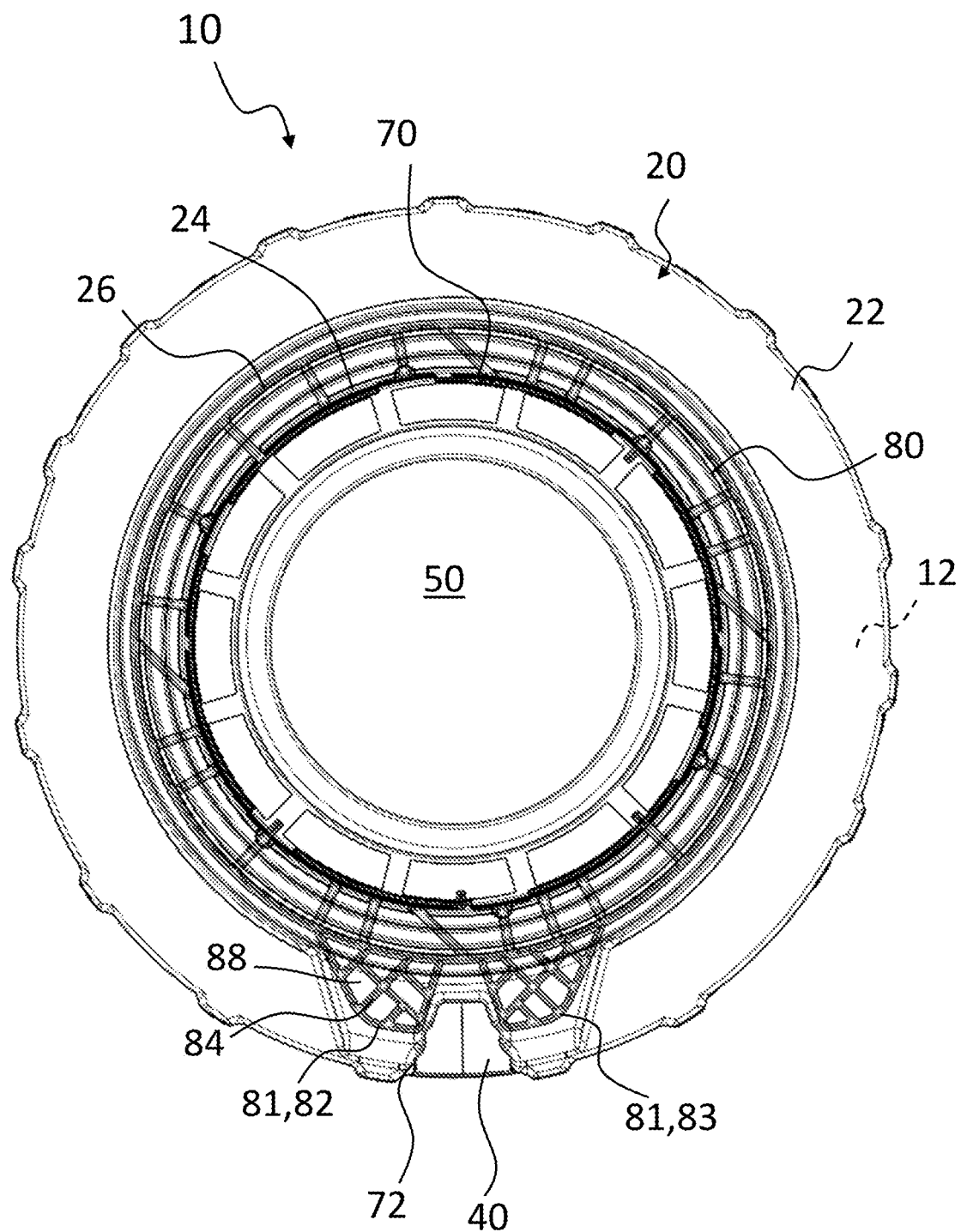
FIG. 3 shows a plan view of the transparently illustrated end disk of the filter element according to FIG. 1.

In the embodiment illustrated in FIGS. 1 to 3, only one notch 40 can be seen at the first end disk 22. However, the filter element 10 can optionally also have a notch, which is not visible in this illustration, at the second end disk 32.

The notch 40 expands the distance between two neighboring folds wherein the folds 14 extend as a whole across the entire length of the filter bellows 12.

Preferably, two notches are arranged positioned opposite each other at the end disks and displaced at the circumference, for example, displaced by 180° at the diametrically opposite sides of the filter bellows 12. The notches 40 can also be displaced relative to each other by angles other than 180°.

Between the notches 40, fixation elements 90 can be provided which ensure that in this region the distance between the folds 14 is kept constant. Optionally, conventional fixation elements 90 such as thread coils, glue beads, beads of hot melt, embossments ("pleat lock") transverse to the longitudinal edges 16 of the folds 14, and the like can be provided.

The notches 40 can be produced in different ways. They can be introduced into the filter bellows 12 after the optional fixation elements 90 have already been applied. The notches 40 can be introduced during manufacture of the end disks 22, 32 into the filter bellows 12 or by insert parts or spreading elements at the support pipe, and the like. The two notches 40 at filter bellows 12 can be formed in the same manner or with different methods.

In FIG. 2, the filter element 10 according to FIG. 1 is illustrated with transparently illustrated end disk 22 which shows a support structure 81 arranged at the support pipe 70.

In FIG. 3, a plan view of the transparently illustrated end disk 22 of the filter element 10 can be seen.

The support pipe 70 comprises at the end 20 with the notch 40 a support structure 81 with two wings 82, 83 which is oriented radially away from the support pipe 70 and which is integrated into the respective end disk 22, 32 at both sides of the notch 40. The support pipe 70 comprises in this context at the end 20 with the notch 40 a radially outwardly oriented collar 80 at which the support structure 81 is arranged. The two wings 82, 83 of the support structure 81 are arranged symmetrically in relation to a symmetry plane of the notch 40 which extends in the longitudinal axis L. The two wings 82, 83 of the support structure 81 are of an areal configuration and comprise a trapezoidal shape which is tapering radially outwardly. Alternatively, the wings 82, 83 can also be designed, for example, triangular. For mechanical reinforcement, the support structure 81 comprises a rib structure 84 with through holes 88.

The support structure 81 which is arranged at a support pipe 70 of the filter element 10 mechanically reinforces the end disk 22 and in particular the notch structure 72 of the end disk 22. In this way, the risk can be reduced that the end disk 22 in case of positionally incorrect installation in the housing 102 of the filter system 100 is bent, whereby the folds 14 are protected upon installation of the filter element 10. The installation force can therefore be introduced into the support pipe 70. The two wings 82, 83 of the support structure 81 can be arranged advantageously such that they effectively reinforce the notch structure 72 of the end disk 22 against mechanical pressure during installation of the filter element 10 in the housing 102 of the filter system 100.

In particular, the two wings 82, 83 of the support structure 81 are arranged together with the radially outwardly oriented collar 80 in a plane perpendicular to the longitudinal axis L. The wings 82, 83 do not project axially into the filter bellows 12 but are located at the level of the end disk 22.

The two wings 82, 83 are arranged in the end disk 22 so as to adjoin as closely as possible the notch 40. The wings 82, 83 are designed to support and absorb in circumferential direction forces which widen the notch 40. The rib structure 84 of the wings 82, 83 advantageously reinforces them for this purpose.

Figure 4:
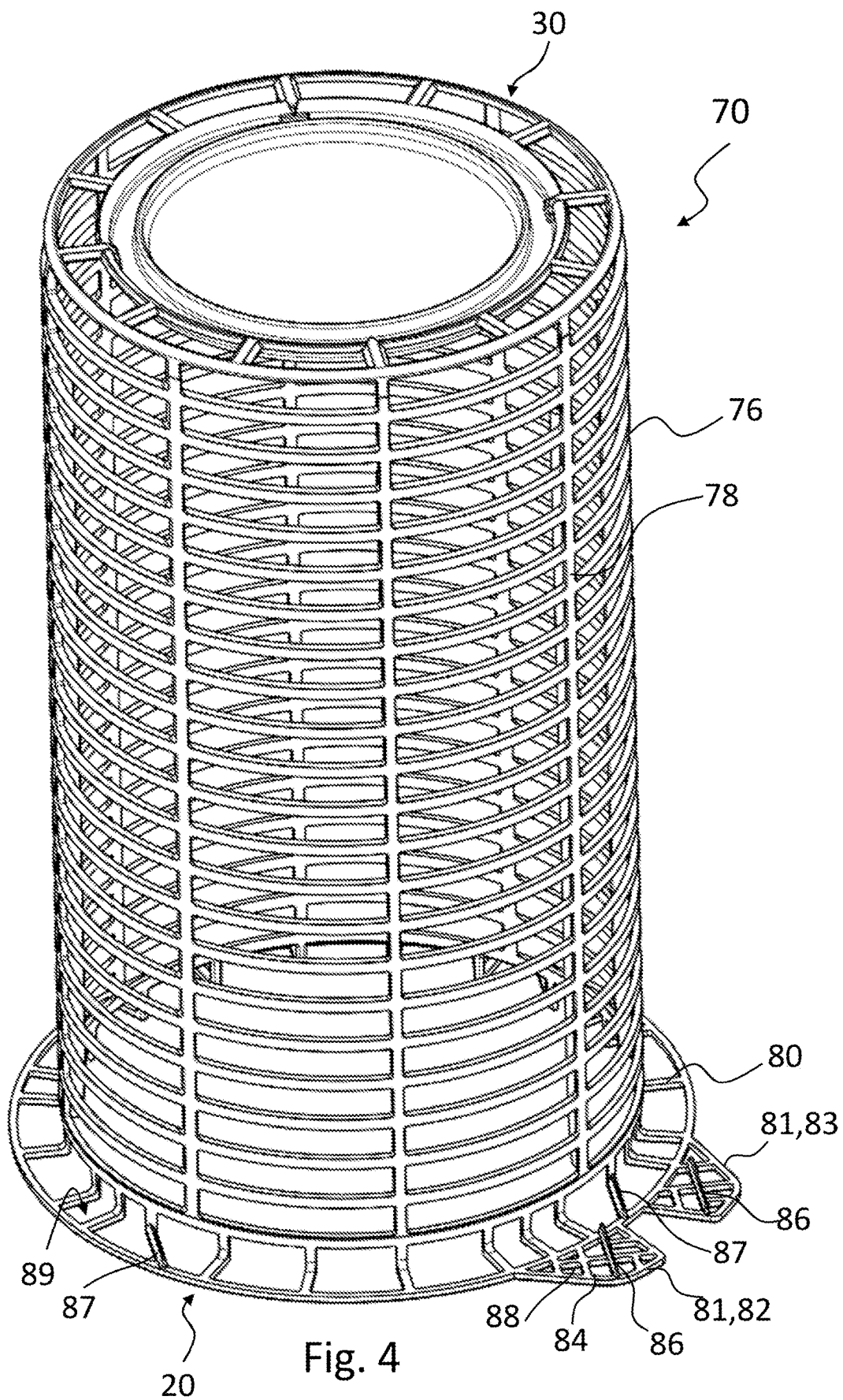
FIG. 4 shows the support pipe with support structure of the filter element according to FIG. 1 in isometric illustration.
Figure 5:
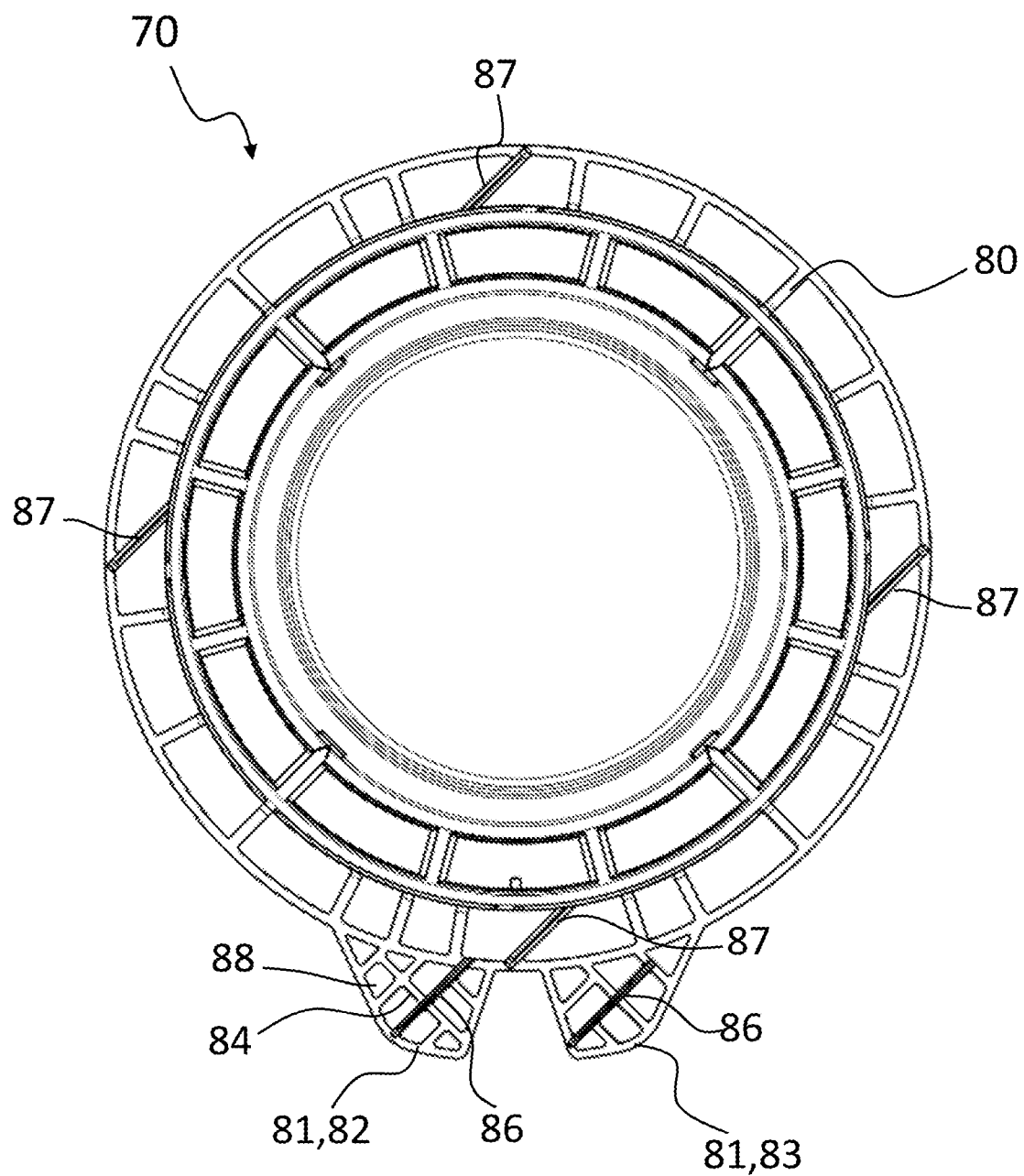
FIG. 5 shows a plan view of the support pipe with support structure according to FIG. 4.

FIG. 4 shows the support pipe 70 with support structure 81 in isometric illustration while in FIG. 5 a plan view of the support pipe 70 with support structure 81 is illustrated. In these illustrations, the circumferential collar 80 which is extending at the end of the support pipe 70 radially outwardly can be seen with the wings 82, 83 of the support structure 81 arranged thereat. The flat annular arrangement of collar 80 and wings 82, 83 can be seen well also. The wings 82, 83 of the support structure 81 extend substantially in radial direction.

Furthermore, in FIGS. 4 and 5 it can be seen that the support structure 81 and the radially outwardly oriented collar 80 at the end 20 with the notch 40, at which the support structure 81 is arranged, comprise positioning ribs 86, 87. The positioning ribs 86, 87 are configured in longitudinal direction L of the support pipe 70 so as to project past a surface 89, which is defined by the support structure 81 and the collar 82, toward the other end 30 of the support pipe 70.

By means of the positioning ribs 86, 87, a predetermined axial distance in longitudinal direction L between the collar 80 of the support pipe 70 or the support structure 81, which both are integrated in the end disk 22, and an end face of the filter bellows 12 can be maintained during the manufacture of the filter element 10. In this way, the filter bellows 12 can be held in a fixed axial position relative to the support pipe 70 during the foaming process when manufacturing the end disk 22. In this manner, it can be prevented that air bubbles form in the region between collar 80 and/or support structure 81 in the PUR end disk 22 or stay adhered in this region, which could lead to possible leakage between raw region and clean region of the filter system 100 in operation of the filter element 10.

As can be seen in particular in FIG. 5, the positioning ribs 86, 87 are arranged parallel to each other. In this manner, the manufacturing tool of the support pipe 70 can be beneficially designed with a suitable demolding direction.

The positioning ribs 87 arranged on the collar 80 are arranged distributed across a collar surface at the collar 80. In this manner, a uniform support of the end face of the filter bellows 12 on the collar 80 can be ensured. Also, the risk that the filter bellows 12 tilts during installation is reduced thereby.

FIG. 6 shows a side view of a part of the filter bellows 12 with support pipe 70 with indicated detail A. FIG. 7 shows correspondingly the detail A of the filter bellows 12 with support pipe 70 according to FIG. 6.

The filter bellows 12 is cut off in the illustration. The end of the support pipe 70 with collar 80 arranged thereat and the support structure 81 project from the interior of the filter bellows 12. In particular in FIG. 7, one can see in the gap between collar 80 and filter bellows 12 that a predetermined distance between the collar 80 or the support structure 81 and the end face 91 of the filter bellows 12 can be adjusted due to the positioning ribs 86, 87 arranged at the collar 80 and at the support structure 81.

A height 92 of the positioning ribs 87 above the surface 89 beneficially can amount to at least half the thickness 94 of the support structure 81 in longitudinal direction L in order to adjust a sufficient distance between the surface 89 and the end face 91 of the filter bellows 12 so that during the manufacturing process of the end disk 22 no air bubbles are caught between collar 80 and filter bellows 12. Typical values for an axial rib thickness of the rib structure 84 of the collar 80 and/or of the support structure 81 can lie within a range between 2.5 mm and 3.0 mm. An axial elevation above the surface 89 which is formed by the collar 80 and/or support structure 81 therefore can amount beneficially to at least 1.25 mm. Values of approximately 2.5 mm have been found to be very beneficial.

In FIG. 8, the filter element 10 is illustrated with a portion of the cut-open housing 102 of the filter system 100. The housing part 104 is illustrated as a quarter segment in order to show the counter element 120, which is arranged in the housing part 104, of the notch 40 of the filter element 10. In case of a positionally incorrect installation of the filter element, for example, a rotation about the longitudinal axis L, this counter element 120 could exert a force on the end disk 22 which could lead to a deformation of the folds 14 of the filter bellows 12 in the region of the notch 40. In this illustration, the notch 40 of the filter element 10 is covered by the counter element 120 of the housing part 104 and therefore cannot be seen.

FIG. 9 shows an isometric view of a filter system 100 according to an embodiment of the invention. In the mounted arrangement of the filter system 100, the two housing parts 104, 106 are joined at the joining region 105, for example, screwed. With the housing part 106 embodied as a cover, the filter system 100 can be closed after insertion of the filter element 10. Inlet 110 and outlet 112 of the housing 102 are arranged at the same housing part 104, wherein the inlet is configured for a radial inflow of the filter element 10 while the outlet 112 allows the clean fluid to flow out in longitudinal direction. The outlet 112 is integrated in a socket 114 of the housing part 104. In the housing part 104, neighboring the outlet 112, the counter element 120 of the notch 40 of the filter element 10 can be seen by means of which the filter element 10 can be positioned in a predetermined orientation about the longitudinal axis L. The counter element 120 is embodied in the housing part 104 as a corresponding notch which interacts with the notch 40 at the filter element 10 in a suitable manner.

Also, in the housing part 106 a counter element 122 of a further notch of the filter element 10 can be seen by means of which the filter element 10 can be positioned about the longitudinal axis L in a predetermined orientation. The counter element 122 is formed at the housing part 106 as a corresponding notch which is interacting in a suitable manner with the corresponding notch at the filter element 10.

REFERENCE NUMBERS 10 filter element
12 filter bellows
14 folds
16 fold edges
18 wall surface
20 first end
22 end disk
24 opening in end disk
26 seal, ring 30 second end
32 end disk
40 notch
42 length
50 interior
70 support pipe
72 notch structure
76 body
78 inner rib
80 collar
81 support structure
82 wing
83 wing
84 rib structure
86 positioning rib
87 positioning rib
88 through hole
89 surface
90 fixation element
91 end face
92 height
94 thickness
100 filter system
102 housing
104 housing part
105 connection
106 housing part
110 inlet
112 outlet
114 socket
120 counter element of the notch
122 counter element of the notch
L longitudinal axis (longitudinal direction)

What is claimed is:

1. A filter element for filtering a fluid, the filter element comprising:
   a longitudinal axis;
   a support pipe;
   a filter bellows arranged about the longitudinal axis on the support pipe and enclosing an interior, wherein the filter bellows comprises folds with radially outer fold edges positioned in an outer wall surface of the filter bellows;
   the filter bellows comprising a first axial end and a second axial end oppositely positioned to the first axial end;
   the filter bellows comprising a notch at least at one of the first and second axial ends, wherein an axial length of the notch in a longitudinal direction of the longitudinal axis is shorter than a longitudinal extension of the filter bellows in the longitudinal direction of the longitudinal axis, wherein the at least one of the first and second axial ends with the notch comprises an end disk;
   the support pipe comprising a support structure at the at least one of the first and second axial ends with the notch, wherein the support structure comprises at least two wings, wherein the support structure is oriented radially away from the support pipe and is integrated into the end disk at both sides of the notch.

2. The filter element according to claim 1, wherein the support pipe comprises a radially outwardly oriented collar at the at least one of the first and second axial ends with the notch, wherein the support structure is arranged at the radially outwardly oriented collar.

3. The filter element according to claim 2, wherein the at least two wings of the support structure are arranged together with the radially outwardly oriented collar in a plane perpendicular to the longitudinal axis.

4. The filter element according to claim 1, wherein the at least two wings of the support structure are arranged symmetrically in relation to a symmetry plane of the notch, wherein the symmetry plane of the notch extends along the longitudinal axis.

5. The filter element according to claim 1, wherein the at least two wings of the support structure have an areal configuration and comprise a radially outwardly tapering shape.

6. The filter element according to claim 1, wherein the at least two wings of the support structure have an areal configuration.

7. The filter element according to claim 1, wherein the at least two wings of the support structure comprise a radially outwardly tapering shape.

8. The filter element according to claim 1, wherein the at least two wings are arranged in a material of the end disk so as to adjoin the notch.

9. The filter element according to claim 1, wherein the at least two wings are configured to support and absorb, in a circumferential direction of the filter element, forces which expand the notch.

10. The filter element according to claim 1, wherein the support structure comprises a rib structure with through holes.

11. The filter element according to claim 1, wherein the support structure comprises positioning ribs which project in the longitudinal direction past a surface, defined by the support structure, toward an end of the support pipe opposite the at least one of the first and second axial ends with the notch.

12. The filter element according to claim 11, wherein the positioning ribs are aligned parallel to each other.

13. The filter element according to claim 11, wherein a height of the positioning ribs above the surface amounts to at least half a thickness of the support structure in the longitudinal direction.

14. The filter element according to claim 1, further comprising a radially outwardly oriented collar at the at least one of the first and second axial ends with the notch, wherein the support structure is arranged at the radially outwardly oriented collar, wherein the radially outwardly oriented collar comprises first positioning ribs which project in the longitudinal direction past a collar surface, defined by the radially outwardly oriented collar, toward an end of the support pipe opposite the at least one of the first and second axial ends with the notch.

15. The filter element according to claim 14, wherein the support structure comprises second positioning ribs which project in the longitudinal direction past a surface, defined by the collar surface and by the support structure, toward the end of the support pipe opposite the at least one of the first and second axial ends with the notch.

16. The filter element according to claim 15, wherein the first and/or the second positioning ribs are aligned parallel to each other.

17. The filter element according to claim 15, wherein a height of the first and/or second positioning ribs above the collar surface and/or above the surface defined by the collar surface and by the support structure amounts to at least half a thickness of the support structure in the longitudinal direction.

18. The filter element according to claim 14, wherein the first positioning ribs are arranged distributed about the collar surface.

19. The filter element according to claim 1, wherein the folds at least in sections are held by fixation elements at a constant distance relative to each other.

20. A filter system comprising:
a housing with a fluid inlet and a fluid outlet;
an exchangeable filter element for filtering a fluid arranged in the housing, the filter element comprising:
a longitudinal axis;
a support pipe;
a filter bellows arranged about the longitudinal axis on the support pipe and enclosing an interior, wherein the filter bellows comprises folds with radially outer fold edges positioned in an outer wall surface of the filter bellows;
the filter bellows comprising a first axial end and a second axial end oppositely positioned to the first axial end;
the filter bellows comprising a notch at least at one of the first and second axial ends, wherein an axial length of the notch in a longitudinal direction of the longitudinal axis is shorter than the longitudinal extension of the filter bellows in the longitudinal direction of the longitudinal axis, wherein the at least one of the first and second axial ends with the notch comprises an end disk;
the support pipe comprising a support structure at the at least one of the first and second axial ends with the notch, wherein the support structure comprises at least two wings, wherein the support structure is oriented radially away from the support pipe and is integrated into the end disk at both sides of the notch.

21. The filter system according to claim 20, wherein the support pipe comprises a radially outwardly oriented collar at the at least one of the first and second axial ends with the notch, wherein the support structure is arranged at the radially outwardly oriented collar.

22. The filter system according to claim 20, wherein the support structure comprises positioning ribs which project in the longitudinal direction past a surface, defined by the support structure, toward an end of the support pipe opposite the at least one of the first and second axial ends with the notch.

23. The filter system according to claim 20, further comprising a radially outwardly oriented collar at the at least one of the first and second axial ends with the notch, wherein the support structure is arranged at the radially outwardly oriented collar, wherein the radially outwardly oriented collar comprises first positioning ribs which project in the longitudinal direction past a collar surface, defined by the radially outwardly oriented collar, toward an end of the support pipe opposite the at least one of the first and second axial ends with the notch.

24. The filter system according to claim 23, wherein the support structure comprises second positioning ribs which project in the longitudinal direction past a surface, defined by the collar surface and by the support structure, toward the end of the support pipe opposite the at least one of the first and second axial ends with the notch.

* * * * *